(12) United States Patent
Garrett et al.

(10) Patent No.: US 7,069,290 B2
(45) Date of Patent: Jun. 27, 2006

(54) POWER EFFICIENT BOOTH RECODED MULTIPLIER AND METHOD OF MULTIPLICATION

(75) Inventors: David Garrett, Pyrmont (AU); Geoff Knagge, Parramatta (AU); Christopher J. Nicol, Hornsby (AU)

(73) Assignee: Lucent Technologies Inc., Murray Hill, NJ (US)

( * ) Notice: Subject to any disclaimer, the term of this patent is extended or adjusted under 35 U.S.C. 154(b) by 587 days.

(21) Appl. No.: 10/138,428

(22) Filed: May 6, 2002

(65) Prior Publication Data

US 2003/0208519 A1    Nov. 6, 2003

(51) Int. Cl.
*G06F 7/52* (2006.01)
(52) U.S. Cl. ...................................... 708/625; 708/628
(58) Field of Classification Search ................ 708/620, 708/625, 626, 627, 628, 629, 630, 631, 632, 708/425, 428
See application file for complete search history.

(56) References Cited

U.S. PATENT DOCUMENTS

| | | | | |
|---|---|---|---|---|
| 5,661,673 A | * | 8/1997 | Davis | ......................... 708/628 |
| 5,787,029 A | * | 7/1998 | de Angel | .................... 708/628 |
| 6,065,032 A | | 5/2000 | Nicol | |
| 6,275,842 B1 | | 8/2001 | Nicol | |

OTHER PUBLICATIONS

Weste, N. et al. *Principles of CMOS VLSI Design*, 2$^{nd}$ Edition, 1992, pp. 291-292, 304-305, 547-555.

* cited by examiner

*Primary Examiner*—Chuong D Ngo

(57) ABSTRACT

In the multiplier, a partial product circuit generates a partial product based on a multiplicand operand and outputs of a Booth recoder circuit, which operates on a multiplier operand. The partial product circuit ANDs the multiplicand with a zero Booth recoded output, which indicates whether to zero out the multiplicand. An enable circuit selectively enables the multiplier circuit, and more particularly, disables the multiplier circuit by making the zero Booth recoded output indicate to zero out the multiplicand.

15 Claims, 2 Drawing Sheets

POWER EFFICIENT BOOTH RECODED MULTIPLIER AND METHOD OF MULTIPLICATION

BACKGROUND OF THE INVENTION

1. Field of the Invention

The present invention relates to Booth recoded multipliers; and more particularly, power efficient Booth recoded multipliers.

2. Description of Related Art

A standard approach that might be taken by a novice to multiplication is to "shift and add", or normal "long multiplication". That is, for each column in the multiplier, shift the multiplicand the appropriate number of columns and multiply it by the value of the digit in that column of the multiplier, to obtain a partial product. The partial products are then added to obtain the final result:

```
              0 0 1 0 1 1
              0 1 0 0 1 1
              _____
              0 0 1 0 1 1
            0 0 1 0 1 1
          0 0 0 0 0 0
        0 0 0 0 0 0
      0 0 1 0 1 1
      _____
      0 0 1 1 0 1 0 0 0 1
```

With this system, the number of partial products is exactly the number of columns in the multiplier.

It is possible to reduce the number of partial products by half using the technique of radix 4 Booth recoding. The basic idea is that, instead of shifting and adding for every column of the multiplier term and multiplying by 1 or 0, we only take every second column, and multiply by ±1, ±2, or 0, to obtain the same results. So, to multiply by 7, we can multiply the partial product aligned against the least significant bit by −1, and multiply the partial product aligned with the third column by 2:

Partial Product 0=Multiplicand*−1, shifted left 0 bits (×−1)

Partial Product 1=Multiplicand*2, shifted left 2 bits (×8)

This is the same result as the equivalent shift and add method:

Partial Product 0=Multiplicand*1, shifted left 0 bits (×1)

Partial Product 1=Multiplicand*1, shifted left 1 bits (×2)

Partial Product 2=Multiplicand*1, shifted left 2 bits (×4)

Partial Product 3=Multiplicand*0, shifted left 3 bits (×0)

The advantage of this method is the halving of the number of partial products. This is important in circuit design as it relates to the propagation delay in the running of the circuit, and the complexity and power consumption of its implementation.

It is also important to note that there is comparatively little complexity penalty in multiplying by 0, 1 or 2. All that is needed is a multiplexer or equivalent, which has a delay time that is independent of the size of the inputs. Negating 2's complement numbers has the added complication of needing to add a "1" to the LSB, but this can be overcome by adding a single correction term with the necessary "1"s in the correct positions.

To Booth recode the multiplier term, the bits of the multiplier operand are considered in blocks of three, such that each block overlaps the previous block by one bit. Grouping starts from the LSB, and the first block only uses two bits of the multiplier (since there is no previous block to overlap):

```
0 1 |0 1| |1 0| |1 0| |1 1|
```

The overlap is necessary so that what happened in the last block is known, as the MSB of the block acts like a sign bit. The following table is then consulted to decide what the encoding will be:

| Block | Partial Product |
|-------|-----------------|
| 000   | 0               |
| 001   | 1 * Multiplicand |
| 010   | 1 * Multiplicand |
| 011   | 2 * Multiplicand |
| 100   | −2 * Multiplicand |
| 101   | −1 * Multiplicand |
| 110   | −1 * Multiplicand |
| 111   | 0               |

Since the LSB of each block is used to know what the sign bit was in the previous block, and there are never any negative products before the least significant block, the LSB of the first block is always assumed to be 0. Hence, we would recode our example of 7 (binary 0111) as such:

|          | 0 | 1 | 1 | 1 |   |                |
|----------|---|---|---|---|---|----------------|
| block 0: |   |   | 1 | 1 | 0 | Encoding: *(−1) |
| block 1: | 0 | 1 | 1 |   |   | Encoding: *(2)  |

In the case where there are not enough bits to obtain a MSB of the last block, we sign extend the multiplier by one bit:

|          | 0 | 0 | 1 | 1 | 1 |   |                |
|----------|---|---|---|---|---|---|----------------|
| block 0: |   |   |   | 1 | 1 | 0 | Encoding: *(−1) |
| block 1: |   | 0 | 1 | 1 |   |   | Encoding: *(2)  |
| block 2: | 0 | 0 | 0 |   |   |   | Encoding: *(0)  |

The previous example then becomes:

|   |   |   |   | 0 | 0 | 1 | 0 | 1 | 1 | , multiplicand |
|---|---|---|---|---|---|---|---|---|---|----------------|
|   |   |   |   | 0 | 1 | 0 | 0 | 1 | 1 | , multiplier   |
|   |   |   |   | 1 |   | 1 |   | −1 |  | , booth encoding of multiplier |
| 1 | 1 | 1 | 1 | 1 | 1 | 0 | 1 | 0 | 0 | , negative term sign extended |
| 0 | 0 | 0 | 0 | 1 | 0 | 1 | 1 |   |   |                |
| 0 | 0 | 1 | 0 | 1 | 1 |   |   |   |   |                |

-continued

|   |   |   |   |   | 0 | 0 | 0 | 0 | 1 | , error correction for negation |
|---|---|---|---|---|---|---|---|---|---|---|
| 0 | 0 | 1 | 1 | 0 | 1 | 0 | 0 | 0 | 1 | , discarding the carried high bit |

Booth recoders, their structure and use in multipliers, are described by N. Weste and K. Eshraghian on pages 547–554 of Principles of CMOS VLSI Design, $2^{nd}$ Ed, Addison Wesley 1992.

Depending on the size of the multiplier and multiplicand (the two operands in the multiplication), Booth recoders reduce the critical path of multipliers when implemented in hardware, software, etc. Namely, the processing time through the multiplier is reduced as compared to when Booth recoding is not employed. This is important because multipliers tend to have the longest processing time of all the functional units.

Besides processing time, power consumption is another important issue of concern when designing multipliers. Because the multiplier operates on the operands along with other functional units, regardless of whether the product produced by the multiplier is needed, needless power consumption takes place. There are a number of traditional methods that have been used to render the output of the multiplier constant, and thus reduce power consumption by the multiplier. One approach involves ANDing one or both of the operands (multiplier and multiplicand) with an enable signal and ANDing the negative Booth recoded signal, which indicates whether to take the negative of the partial product being generated, with the enable signal. When the enable signal is set to one, the multiplier performs in the same manner as if the enable circuitry were absent. Accordingly, partial products are determined based on the multiplicand operand and the Booth recoded outputs, which are generated based on the multiplier operand, and a negative of the partial product is chosen based on the negative Booth recoded output. However, when the enable signal is sent to zero, the multiplicand operand is zeroed out by the ANDing with the enable signal, and a negative of the resulting zero partial product is not generated because the negative Booth recoded output is zeroed out by being ANDed with the enable signal. A still further method requires creating an inverse of the negative Booth recoded signal, ANDing the negative and inverse negative Booth recoded signals with the enable signal, and using the resultant output to control whether a partial product or its negative are output such that the output of the partial product circuit remains constant.

SUMMARY OF THE INVENTION

In the multiplier circuit and method of multiplication according to the present invention, partial products are generated using the well-known Booth recoder that generates a zero Booth recoded output, neg Booth recoded output and a shift Booth recoded output. The zero Booth recoded output indicates whether to zero out the multiplicand, the negative Booth recoded output indicates whether to create a negative partial product, and the shift Booth recoded output indicates whether to shift bits of the partial product left one position.

Partial products are held constant to reduce power consumption by making the zero Booth recoded output a value indicating to zero output the multiplicand. When the zero Booth recoded output indicates to zero out the multiplicand, zero is generated as the partial product.

This is accomplished by ANDing the zero Booth recoded signal with an enable signal. Also, the neg Booth recoded signal is ANDed with the enable signal so that the partial product outputs a zero value if the shift Booth recoded output indicates to shift the partial product to the left one position. Additionally, this technique does not increase the critical path of the multiplier; namely, this technique does not increase the processing time of the multiplier.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

The Booth recoder for use in the multiplier according to the present invention will first be described. Then the partial product generating circuits according to embodiments of the present invention are described.

Booth Recoder

Figure 1:
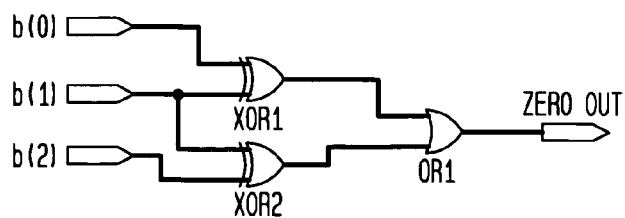
FIGS. 1–3 illustrate prior art circuit diagrams of the three circuits that generate the three Booth recoded outputs used by the partial product generating circuits according to the present invention.
Figure 2:
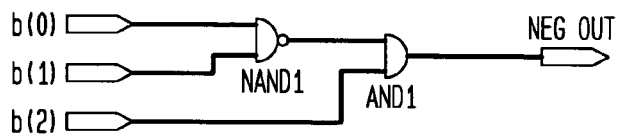
Figure 3:
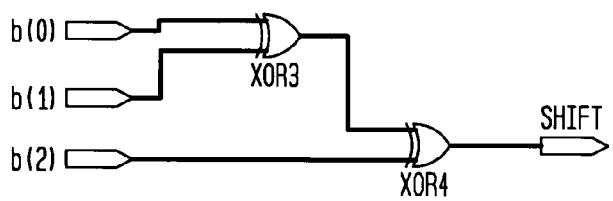

FIGS. 1–3 illustrate prior art circuit diagrams of the three circuits that generate the three Booth recoded outputs used by the partial product generating circuits according to the present invention. As described in the Background of the Invention section, Booth recoders operate on three bits of the multiplier at a time. In FIGS. 1–3, b(0), b(1) and b(2) represent the least, next-to-least and most significant of the three bits being processed. In the Booth recoder implementation of FIGS. 1–3, the Booth recoded outputs are zero out, neg out and shift, respectively. The zero Booth recoded output indicates whether the multiplicand received by the partial product circuits should be zeroed out. Namely, if the three bits of the multiplier are zero, then multiplying the multiplicand by the multiplier will produce a zero partial product. The neg Booth recoded output indicates whether the partial product circuit should generate the negative (i.e., inverse) of the partial product being generated. The shift Booth recoded output indicates whether to shift bits of the partial product left one position.

The Booth recoder circuit for generating the zero Booth recoded output will now be described with respect to FIG. 1. As shown, a first exclusive OR gate XOR1 exclusive-ORs the least and next-to-least significant bits b(0) and b(1), and a second exclusive OR gate XOR2 exclusive-ORs the next-to-least and most significant bits b(1) and b(2). A first OR gate OR1 ORs the outputs from the first and second exclusive OR gates XOR1 and XOR2 to produce the zero Booth recoded output.

The Booth recoder circuit for generating the neg Booth recoded output will now be described with respect to FIG. 2. As shown, a first NAND gate NAND1 NANDs the least and next-to-least significant bits b(0) and b(1), and a first AND gate AND1 ANDs the most significant bit b(2) and the output from the first NAND gate NAND1 to produce the neg Booth recoded output.

The Booth recoder circuit for generating the shift Booth recoded output will now be described with respect to FIG. 3. As shown, a third exclusive OR gate XOR3 exclusive-ORs the least and next-to-least significant bits b(0) and b(1), and a fourth exclusive OR gate XOR4 exclusive-ORs the most significant bit b(2) and the output from the third exclusive OR gate XOR3 to produce the shift Booth recoded output.

Partial Product Circuit—Least Significant Bit (LSB)

Figure 4:
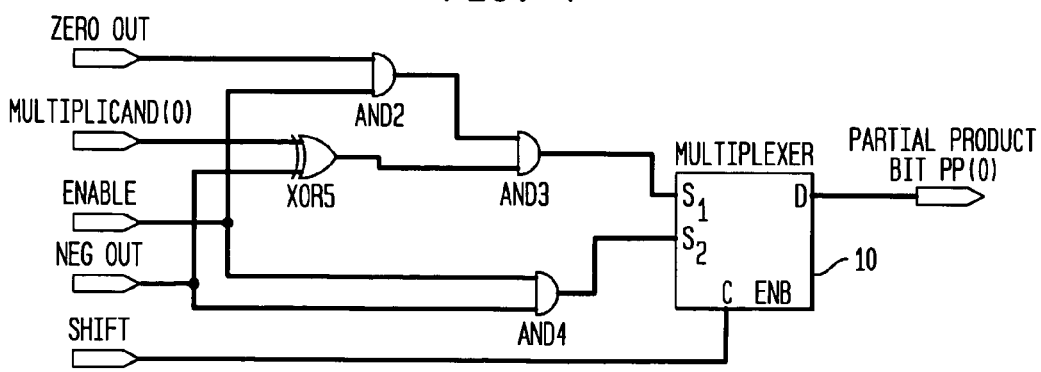
FIG. 4 illustrates a partial product circuit for generating the least significant bit pp(0) of the partial product according to an embodiment of the present invention.

FIG. 4 illustrates a partial product circuit for generating the least significant bit pp(0) of the partial product according to an embodiment of the present invention. As shown, a second AND gate AND2 ANDs the zero Booth recoded output and an enable signal. A fifth exclusive OR gate XOR5 exclusive-ORs the least significant bit of the multiplicand, multiplicand(0), and the neg Booth recoded output. A third AND gate AND3 ANDs the outputs of the second AND gate AND2 and the fifth exclusive OR gate XOR5. A fourth AND gate AND4 ANDs the enable signal and the neg Booth recoded output. A multiplexer 10 selectively output one of the outputs from the third AND gate AND3 and the output from the fourth AND gate AND4 based on the shift Booth recoded output. When the shift Booth recoded output is zero, meaning that no shift should occur, the output of the third AND gate AND3 is output as the least significant bit of the partial product pp(0). When the shift Booth recoded output is 1, meaning that a shift should occur, the output of the fourth AND gate AND4 is output as the least significant bit of the partial product pp(0).

When the enable signal is set to 1, the partial product circuit is enabled, and the operation of the second AND gate AND2 and the fourth AND gate AND4 do not change the values of the zero and neg Booth recoded outputs. When the enable signal is set to zero, the partial product circuit is disabled. The second AND gate AND2 changes the zero Booth recoded output to zero such that, assuming that a negative partial product is not being formed (i.e., the multiplexer 10 selects the output of the third AND gate AND3), the least significant bit of the partial product pp(0) will become zero. The fourth AND gate AND4 changes the neg Booth recoded output to zero such that, assuming a negative partial product is being formed (i.e., the multiplexer 10 selects the output of the fourth AND gate AND4), the least significant bit of the partial product pp(0) will become zero. As a result, when the enable signal is zero, the least significant bit of the partial product pp(0) becomes zero and stays zero until the partial product circuit is enabled. Consequently, disabling the partial product circuit causes the output of the partial product to remain constant, which saves power. In this embodiment, the constant output of the partial product circuit is zero.

A further examination of the circuit illustrated in FIG. 4 shows that adding the power saving feature does not increase the critical path of the partial product circuit of FIG. 4. As shown in FIG. 4, the partial product circuit includes two paths with substantially the same processing time, and therefore the two paths qualify as the critical path. The first qualifying path is the fifth exclusive OR gate XOR5, the third AND gate AND3 and the multiplexer 10. The second qualifying path is the second AND gate AND2, the third AND gate AND3 and the multiplexer 10.

If the power saving feature were eliminated from FIG. 4, then the second AND2 gate and the fourth AND4 gates would be eliminated; the zero Booth recoded output would be directly connected to the third AND gate AND3; and the neg Booth recoded output would be directly connected to the second input of the multiplexer 10. The critical path in the absence of this enable/disable circuitry would include the fifth exclusive OR gate XOR5, the third AND gate AND3 and the multiplexer 10. Consequently, the enable/disable circuitry does not change (namely, increase) the critical path. Stated another way, the enable, disable circuitry does not increase the processing time of the partial product circuit.

Partial Product Circuit—ith Significant Bit

Figure 5:
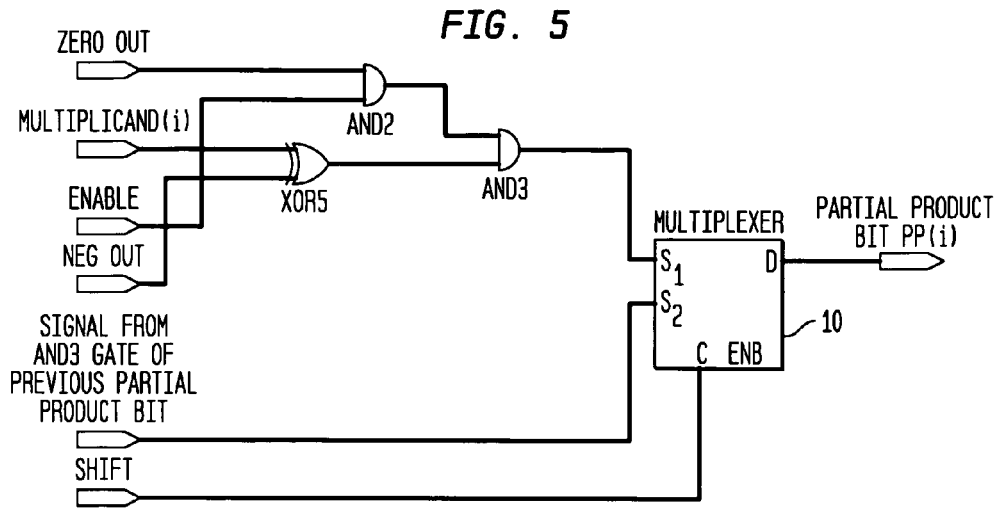
FIG. 5 illustrates a partial product circuit for generating the ith significant bit pp(i) of the partial product according to an embodiment of the present invention.

FIG. 5 illustrates a partial product circuit for generating the ith significant bit pp(i) of the partial product according to an embodiment of the present invention, where i=1 to N−1 and N is the number of bits in the multiplicand. Accordingly, it will be understood that N−1 partial product circuits of FIG. 5 are used when generating the partial product bits in parallel. The structure of the partial product generating circuit of FIG. 5 is the same as that of the partial product circuit generating circuit of FIG. 4, except that the fourth AND gate AND4 has been eliminated; the ith significant bit of the multiplicand, multiplicand (i) is supplied to the fifth exclusive OR gate XOR5 instead of the least significant bit of the multiplicand; and the output of the third AND gate AND3 in generating the (i−1)th bit of the partial product is supplied as the second input to the multiplexer 10.

Accordingly, the partial product circuit of FIG. 5 operates in the same manner with the same advantages as the partial product circuit of FIG. 4, except that when the shift Booth recoded output indicates to shift the partial product to the left one position, the output of the third AND gate AND3 in generating the (i−1)th bit of the partial product is output as the ith bit of the partial product pp(i). More specifically, the partial product circuit of FIG. 5 achieves the same power savings as the partial product circuit of FIG. 4, and the enable/disable circuitry for the partial product circuit of FIG. 5 does not increase the critical path—increase the processing time of the partial product circuit.

Multiplier

To generate the multiplier output, the partial products are summed to obtain the multiplier output. Because this part of the multiplier operation and structure is so well-known in the art, further description and illustration thereof has been omitted for the sake of brevity.

Alternative Embodiment for Partial Product Circuit—LSB

Figure 6:
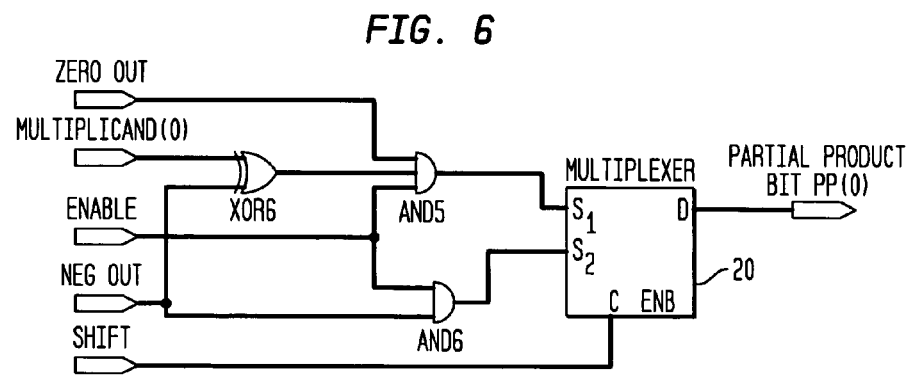
FIG. 6 illustrates another embodiment of a partial product circuit for generating the least significant bit pp(0) of the partial product according to the present invention.

FIG. 6 illustrates another embodiment of a partial product circuit for generating the least significant bit pp(0) of the partial product according to the present invention. As shown, a sixth exclusive OR gate XOR6 exclusive-ORs the least significant bit of the multiplicand, multiplicand(0), and the neg Booth recoded output. A fifth AND gate AND5 ANDs the output of the sixth exclusive OR gate XOR6, the zero Booth recoded output and the enable signal. A sixth AND gate AND6 ANDs the enable signal and the neg Booth recoded output. A multiplexer 20 selectively outputs one of the output from the fifth AND gate AND5 and the output from the sixth AND gate AND6 based on the shift Booth recoded output. When the shift Booth recoded output is zero, meaning that no shift should occur, the output of the fifth AND gate AND5 is output as the least significant bit of the partial product pp(0). When the shift Booth recoded output is 1, meaning that a shift should occur, the output of the sixth AND gate AND6 is output as the least significant bit of the partial product pp(0).

When the enable signal is set to 1, the partial product circuit is enabled, and the operation of the fifth AND gate AND5 and the sixth AND gate AND6 do not change the values of (1) ANDing the zero Booth recoded output with the output of the sixth exclusive OR gate XOR6 or (2) the neg Booth recoded output. When the enable signal is set to zero, the partial product circuit is disabled. The fifth AND gate AND5 essentially changes the zero Booth recoded output to zero such that, assuming that a negative partial product is not being formed (i.e., the multiplexer 20 selects the output of the fifth AND gate AND5), the least significant bit of the partial product pp(0) will become zero. The sixth AND gate AND6 changes the neg Booth recoded to zero such that, assuming a negative partial product is being formed (i.e., the multiplexer 20 selects the output of the sixth AND gate AND6), the least significant bit of the partial product pp(0) will become zero. As a result, when the enable signal is zero, the least significant bit of the partial product pp(0) becomes zero and stays zero until the partial product circuit is enabled. Consequently, disabling the partial product circuit causes the output of the partial product to remain constant, which saves power. In this embodiment, the constant output of the partial product circuit is zero. When using the above described embodiment, the output of the fifth AND gate AND5 is supplied to the next-to-least partial product generating circuit.

Alternative Embodiment for Partial Product Circuit—ith Significant Bit

Figure 7:
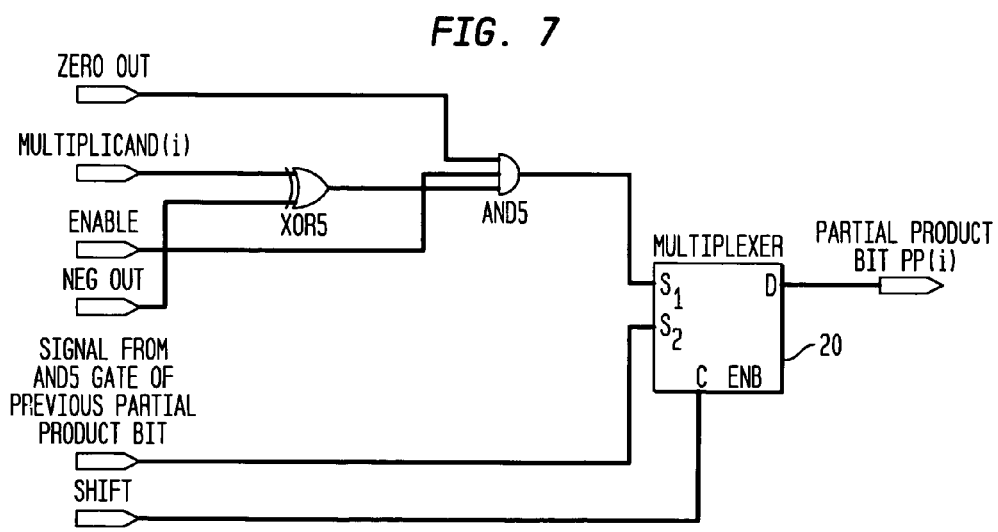
FIG. 7 illustrates another embodiment of a partial product circuit for generating the ith significant bit pp(i) of the partial product according to an embodiment of the present invention.

FIG. 7 illustrates a partial product circuit for generating the ith significant bit pp(i) of the partial product according to an embodiment of the present invention, where i=1 to N−1 and N is the number of bits in the multiplicand. Accordingly, it will be understood that N−1 partial product circuits of FIG. 7 are used when generating the partial product bits in parallel. The structure of the partial product generating circuit of FIG. 7 is the same as that of the partial product circuit generating circuit of FIG. 6, except that the sixth AND gate AND6 has been eliminated; the ith significant bit of the multiplicand, multiplicand (i) is supplied to the fifth AND gate AND5 instead of the least significant bit of the multiplicand; and the output of the fifth AND gate AND5 in generating the (i−1)th bit of the partial product is supplied as the second input to the multiplexer 20.

Accordingly, the partial product circuit of FIG. 7 operates in the same manner with the same advantages as the partial product circuit of FIG. 7, except that when the shift Booth recoded output indicates to shift the partial product to the left one position, the output of the fifth AND gate AND5 in generating the (i−1)th bit of the partial product is output as the ith bit of the partial product pp(i). More specifically, the partial product circuit of FIG. 7 achieves the same power savings as the partial product circuit of FIG. 6.

Implementation

The multiplier of the present invention can be embodied in hardware, software, firmware, etc. For example, in a software implementation, the partial product circuits including the enable/disable circuitry of the present invention are embodied as code segments running on a computer system or stored in a computer readable medium. As another example, the multiplier of the present invention is part of a library from which a multiplier circuit is synthesized by a simulation tool in response to specifications requiring the multiplication of two operands. In particular, the multiplier according to the present invention offers a low power option in the library of simulated multipliers.

The invention being thus described, it will be obvious that the same may be varied in many ways. Such variations are not to be regarded as a departure from the spirit and scope of the invention, and all such modifications are intended to be included within the scope of the following claims.

We claim:

1. A multiplier circuit, comprising:
   a partial product circuit generating a partial product based on outputs of a Booth recoder circuit and a multiplicand, the partial product circuit ANDing the multiplicand with a zero Booth recoded output, the zero Booth recoded output indicating whether to zero out the multiplicand; and
   an enable circuit selectively enabling the multiplier circuit, the enable circuit disabling the multiplier circuit by making the zero Booth recoded output indicate to zero out the multiplicand, wherein the enabling circuit ANDs the zero Booth recoded output and an enable signal.

2. The multiplier circuit of claim 1, wherein the enable circuit holds output of the partial product circuit constant if disabling the partial product circuit.

3. The multiplier circuit of claim 2, wherein the enable circuit holds the output of the partial product circuit to zero if disabling the partial product circuit.

4. The multiplier circuit of claim 1, wherein
   the partial product circuit generating a partial product based on the multiplicand, the zero Booth recoded output and a negative Booth recoded output, the negative Booth recoded output indicates whether to create a negative partial product; and
   the enable circuit disables the multiplier circuit by ANDing the zero Booth recoded output and the neg Booth recoded output with an enable signal.

5. The multiplier circuit of claim 4, wherein
   the Booth recoded outputs further comprise a shift Booth recoded output, the shift Booth recoded output indicating whether to shift bits of the partial product left one position; and
   the partial product circuit generates a value based on the multiplicand, the zero Booth recoded output and the neg Booth recoded output, and selects between the value and the neg Booth recoded output as the partial product based on the shift Booth recoded output.

6. The multiplier circuit of claim 5, wherein
   the enabling circuit ANDs the enable signal with the zero Booth recoded output prior to the partial product circuit using the zero Booth recoded output to generate the partial product, and ANDs the enable signal with the neg Booth recoded output used in the selection of the partial product.

7. A multiplier circuit, comprising:
   an XOR gate exclusive ORing a multiplicand and a negative Booth recoded output, the negative Booth recoded output indicating whether to create a negative partial product;
   a first AND gate ANDing a zero Booth recoded output and an enable signal, the zero Booth recoded output indicating whether to zero out the multiplicand;
   a second AND gate ANDing output from the first AND gate and output from the XOR gate;

a third AND gate ANDing the negative Booth recoded output and the enable signal; and a multiplexer selecting one of output from the second AND gate and the third AND gate as the partial product based on a shift Booth recoded output, the shift Booth recoded output indicating whether to shift bits of the partial product left one position.

8. A multiplier circuit, comprising:

an XOR gate exclusive ORing a multiplicand and a negative Booth recoded output, the negative Booth recoded output indicating whether to create a negative partial product;

a first AND gate ANDing a zero Booth recoded output and an enable signal, the zero Booth recoded output indicating whether to zero out the multiplicand;

a second AND gate ANDing output from the first AND gate and output from the XOR gate;

a multiplexer selecting one of output from the second AND gate and a carry over output from a less significant bit as the partial product based on a shift Booth recoded output, the shift Booth recoded output indicating whether to shift bits of the partial product left one position.

9. A multiplier circuit, comprising:

an XOR gate exclusive ORing a multiplicand and a negative Booth coded output, the negative Booth recoded output indicating whether to create a negative partial product;

a first AND gate ANDing a zero Booth recoded output, an enable signal and output of the XOR gate, the zero Booth recoded output indicating whether to zero out the multiplicand;

a second AND gate ANDing the negative Booth recoded output and the enable signal; and a multiplexer selecting one of output from the first AND gate and the second AND gate as the partial product based on a shift Booth recoded output, the shift Booth recoded output indicating whether to shift bits of the partial product left one position.

10. A multiplier circuit, comprising:

an XOR gate exclusive ORing a multiplicand and a negative Booth coded output, the negative Booth recoded output indicating whether to create a negative partial product;

a first AND gate ANDing a zero Booth recoded output, an enable signal and output of the XOR gate, the zero Booth recoded output indicating whether to zero out the multiplicand;

a multiplexer selecting one of output from the first AND gate and a carry over output from a less significant bit as the partial product based on a shift Booth recoded output, the shift Booth recoded output indicating whether to shift bits of the partial product left one position.

11. A multiplier circuit, comprising:

a first AND gate ANDing a zero Booth recoded output with an enable signal, the zero Booth recoded output indicating whether to zero out a multiplicand and the enabling signal indicating whether to one of enable and disable the multiplier circuit.

12. The multiplier circuit of claim 11, further comprising:

a second AND gate ANDing a neg Booth recoded output with the enable signal, the negative Booth recoded output indicating whether to create a negative partial product.

13. A computer implemented method of multiplying using Booth recoding, comprising:

operating a computer to generate a partial product based on outputs of the Booth recoding and a multiplicand, the generating step comprising:

ANDing the multiplicand with a zero Booth recoded output, the zero Booth recoded output indicating whether to zero out the multiplicand; and selectively disabling the multiplying by making the zero Booth recoded output indicate to zero out the multiplicand, the selective disabling step including ANDing the zero Booth recoded output with an enable signal.

14. A simulation apparatus for simulating a multiplier circuit, comprising:

a simulated partial product circuit generating a partial product based on outputs of a simulated Booth recoder circuit and a multiplicand, the simulated partial product circuit ANDing the multiplicand with a zero Booth recoded output, the zero Booth recoded output indicating whether to zero out the multiplicand; and a simulated enable circuit selectively enabling the simulated multiplier circuit, the simulated enable circuit disabling the simulated multiplier circuit by making the zero Booth recoded output indicate to zero out the multiplicand, wherein the simulated enabling circuit ANDs the zero Booth recoded output and an enable signal.

15. An article of manufacture taking the form of a computer readable medium for simulating a multiplier circuit having a Booth recoder circuit, the article of manufacture comprising:

a first code segment for simulating a partial product circuit that generates a partial product based on outputs of a simulated Booth recoder circuit and a multiplicand, the simulated partial product circuit ANDing the multiplicand with a zero Booth recoded output, the zero Booth recoded output indicating whether to zero out the multiplicand; and a second code segment for simulating an enable circuit selectively enabling the simulated multiplier circuit, the simulated enable circuit disabling the simulated multiplier circuit by making the zero Booth recoded output indicate to zero out the multiplicand, wherein the simulated enabling circuit ANDs the zero Booth recoded output and an enable signal.

* * * * *